United States Patent
Xie et al.

(10) Patent No.: US 10,841,279 B2
(45) Date of Patent: Nov. 17, 2020

(54) LEARNING NETWORK TOPOLOGY AND MONITORING COMPLIANCE WITH SECURITY GOALS

(71) Applicant: Fortinet, Inc., Sunnyvale, CA (US)

(72) Inventors: Michael Xie, Palo Alto, CA (US); Robert A. May, North Vancouver (CA); Ling Clarke, Richmond (CA)

(73) Assignee: Fortinet, Inc., Sunnyvale, CA (US)

(*) Notice: Subject to any disclaimer, the term of this patent is extended or adjusted under 35 U.S.C. 154(b) by 323 days.

(21) Appl. No.: 15/855,897

(22) Filed: Dec. 27, 2017

(65) Prior Publication Data
US 2018/0324218 A1    Nov. 8, 2018

Related U.S. Application Data

(60) Provisional application No. 62/503,252, filed on May 8, 2017.

(51) Int. Cl.
*H04L 29/06* (2006.01)
*H04W 24/02* (2009.01)
(Continued)

(52) U.S. Cl.
CPC .......... *H04L 63/0236* (2013.01); *H04L 41/12* (2013.01); *H04L 63/0263* (2013.01);
(Continued)

(58) Field of Classification Search
CPC ..... H04L 63/0236; H04L 63/20; H04L 63/08; H04L 63/1441; H04L 41/12;
(Continued)

(56) References Cited

U.S. PATENT DOCUMENTS 7,493,650 B2 * 2/2009 Peled .................... G06F 21/10
                                                    726/1
7,512,071 B2 * 3/2009 Goldschmidt .......... H04L 47/10
                                                    370/235
(Continued)

OTHER PUBLICATIONS

Neil Spring, University of Washington, 2004, "Efficient discovery of Network Topology and Routing Policy on the Internet" teaches a method of discovering topologies and routing policies of ISPs.*
(Continued)

*Primary Examiner* — Robert B Leung
*Assistant Examiner* — Thomas Ho
(74) *Attorney, Agent, or Firm* — Jaffery Watson Mendonsa & Hamilton LLP

(57) ABSTRACT

Systems and methods for monitoring compliance with security goals by a network or part thereof are provided. According to one embodiment, a topology of a network segment of a private network is discovered by a network security device associated with the private network. Security policies implemented by one or more network security devices that form part of the network segment are learned by the network security device. Compliance with a security goal associated with the network segment is then determined by the network security device by: (i) analyzing traffic passing through the network segment; (ii) analyzing respective system configurations of the one or more network security devices; and (iii) evaluating performance of the security policies based on the traffic.

25 Claims, 15 Drawing Sheets

(51) Int. Cl.
*H04W 12/06* (2009.01)
*H04L 12/24* (2006.01)

(52) U.S. Cl.
CPC .......... *H04L 63/08* (2013.01); *H04L 63/1408* (2013.01); *H04L 63/1441* (2013.01); *H04L 63/20* (2013.01); *H04W 12/06* (2013.01); *H04W 24/02* (2013.01)

(58) Field of Classification Search
CPC ............. H04L 63/0263; H04L 63/1408; H04L 63/1433; H04L 63/0209; H04W 24/02; H04W 12/06
See application file for complete search history.

(56) References Cited

U.S. PATENT DOCUMENTS

| | | | | |
|---|---|---|---|---|
| 7,548,545 | B1* | 6/2009 | Wittenschlaeger | H04L 49/254 370/400 |
| 8,990,392 | B1* | 3/2015 | Stamos | H04L 43/08 709/224 |
| 9,264,395 | B1* | 2/2016 | Stamos | H04L 61/1511 |
| 9,342,691 | B2 | 5/2016 | Maestas | |
| 9,503,477 | B2* | 11/2016 | May | H04L 63/10 |
| 9,608,961 | B2* | 3/2017 | Yin | H04L 63/0236 |
| 10,454,935 | B2 | 10/2019 | Parimi et al. | |
| 2002/0069200 | A1* | 6/2002 | Cooper | H04L 41/0609 |
| 2005/0257267 | A1* | 11/2005 | Williams | H04L 63/0227 726/25 |
| 2006/0064484 | A1* | 3/2006 | Fawcus | H04L 45/00 709/224 |
| 2006/0094400 | A1 | 5/2006 | Beachem et al. | |
| 2006/0182034 | A1* | 8/2006 | Klinker | H04L 43/00 370/238 |
| 2006/0271677 | A1* | 11/2006 | Mercier | G06F 16/1824 709/224 |
| 2008/0162452 | A1* | 7/2008 | Cox | H04L 41/0893 |
| 2009/0024663 | A1 | 1/2009 | McGovern | |
| 2012/0297042 | A1* | 11/2012 | Davis | H04L 63/164 709/223 |
| 2014/0013434 | A1* | 1/2014 | Ranum | H04L 63/145 726/24 |
| 2014/0254592 | A1 | 9/2014 | Olofsson et al. | |
| 2015/0372977 | A1* | 12/2015 | Yin | H04L 63/0236 726/1 |
| 2017/0353459 | A1* | 12/2017 | Lawrence | H04L 63/10 |
| 2018/0027006 | A1 | 1/2018 | Zimmerman et al. | |
| 2019/0007418 | A1* | 1/2019 | Cook | H04L 63/105 |
| 2019/0089740 | A1* | 3/2019 | Hastings | H04L 63/20 |
| 2019/0089741 | A1* | 3/2019 | Hill | H04L 63/0876 |

OTHER PUBLICATIONS

Alharbi et al, IEEE 2015, "The Insecurity of Topology Discovery in Software Defined Networks" teaches vulnerabilities of topology discovery in SDNs.*
U.S. Appl. No. 15/938,629, filed Mar. 28, 2018.
U.S. Appl. No. 15/855,230, filed Dec. 27, 2017.
Non-Final Office Action for US. Appl. No. 15/938,629, dated Feb. 12, 2020, 21 pages.

* cited by examiner

350

GOALS PROFILES
352

354 → + ADD NEW

| PROFILE NAME 356 | | |
|---|---|---|
| LAN 358a | EDIT | DELETE |
| DMZ 358b | EDIT | DELETE |

| ASSIGN GOALS TO PROFILE TO FGT INTERFACE 360 | | |
|---|---|---|
| DEVICE 362 | INTERFACE 364 | GOALS PROFILES 366 |
| NETWORK SECURITY DEVICE 1 | PORT 1 | LAN ▼ |
| | PORT 2 | DMZ ▼ |
| | PORT 3 | LAN ▼ |
| NETWORK SECURITY DEVICE 2 | PORT 4 | DMZ ▼ |
| | PORT 5 | LAN ▼ |
| | PORT 6 | DMZ ▼ |
| NETWORK SECURITY DEVICE 3 | PORT 7 | LAN ▼ |
| | PORT 8 | LAN ▼ |

| Network Security Device 402 | LAN Segment 404 | Action 406 |
|---|---|---|
| Network Security Device 1 | Port 8 | To Meet the Vulnerability Scan and Patch Management Goal, We Recommended to Install Network Security Device Or All Hosts in This Network<br><br>Unprotected Hosts Detected:<br>- Windows-jJones (192.168.8.4)<br>- Windows-rHanderson (192.168.8.5)<br>- Windows-lTomlinson (192.168.8.6)<br>- Mac-jWhittle (10.44.8.1)<br>- Mac-mVaughan (10.44.8.2)<br>- Mac-rSmith (10.44.8.3) |
| Network Security Device 2 | Port 4 | To meet the Host Anti-Virus Goal, We Recommended to Install Network Device on all Hosts in This Network<br><br>Unprotected Hosts Detected :<br>- Windows-kAmarwah (192.11.12.4)<br>- Windows-rHanderson (192.11.12.5) |

| PERFORMANCE RECOMMENDATION | |
|---|---|
| NETWORK SECURITY DEVICE 502 | PERFORMANCE RECOMMENDATIONS 504 |
| NETWORK SECURITY DEVICE 1 | WE HAVE DETECTED CONTINUOUS HIGH CPU AND MEMORY USAGE ON THIS NETWORK<br><br>SECURITY DEVICE<br>- CPU OVERAGE 91% OVER PAST 24 HOURS<br>- MEMORY AVERAGE 95% OVER PAST 24 HOURS<br><br>WE RECOMMENDED TO UPGRADE THIS NODE TO A HIGHER CAPACITY NETWORK DEVICE |
| NETWORK SECURITY DEVICE 2 | WE HAVE DETECTED THAT TRAFFIC LOGGING VOLUME ACROSS ALL NETWORK DEVICES<br><br>EXCEEDS THE RECOMMENDED LOG RATE FOR YOUR NETWORK DEVICE:<br>- ACTUAL LOG RATE OVER PAST 24 HOURS – 15,501 LOG/SEC<br>- RECOMMENDED LOG RATE FOR FAZ 1000D – 12,000 LOG/SEC<br><br>WE RECOMMENDED UPGRADING TO A HIGHER END NETWORK DEVICE, OR USING COLLECTOR/<br>ANALYZER MODE WITH MULTIPLE NETWORK DEVICES TO DISTRIBUTE THE LOG COLLECTION |

FIG. 5A

LEARNING NETWORK TOPOLOGY AND MONITORING COMPLIANCE WITH SECURITY GOALS

CROSS-REFERENCE TO RELATED PATENTS

This application claims the benefit of priority of U.S. Provisional Application No. 62/503,252, filed on May 8, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2017, Fortinet, Inc.

BACKGROUND

Field

Embodiments of the present invention generally relate to network security compliance monitoring. In particular, embodiments of the present invention relate to systems and methods for monitoring compliance with defined security goals by a network or a part thereof.

Description of the Related Art

A typical enterprise or data center network includes, among other network devices and servers, multiple network security devices implementing various security-related functions, including, but not limited to, intrusion detection, intrusion prevention, content filtering, anti-malware, antispam, Virtual Private Networking (VPN) capabilities, network traffic/event logging, identity-based access control, Data Leak Prevention (DLP), load balancing, Quality of Service (QoS), SSL/SSH inspection and application control. Network security devices associated with a protected network may have some subset of security measures enabled and may be interconnected in a particular manner creating a network topology.

Ensuring security compliance by the protected network, and by the network devices associated with the protected network, such as endpoints, network assets, network security devices, network management devices, among other network devices that form part of the network is a major challenge as there many network security measures that take place at different layers for different network devices. Ensuring that the network devices, individually and/or collectively, are performing the required/desired security enabling functions has been a challenge for network administrators. It is also possible that there remain some security loopholes in the network, that there are some redundant security measures that are unnecessarily being repeated by the network devices and/or that there are some conflicts among the security measures being taken by different network devices.

Therefore, there exists a need for a system and method that can monitor compliance with security goals by a given network or a part thereof, generate appropriate compliance reports highlighting security loopholes/critical issues, and provide recommendations to address the identified issues.

SUMMARY

Systems and methods are described for monitoring compliance with security goals by a network or part thereof. According to one embodiment, a topology of a network segment of a private network is discovered by a network security device associated with the private network. Security policies implemented by one or more network security devices that form part of the network segment are learned by the network security device. Compliance with a security goal associated with the network segment is then determined by the network security device by: (i) analyzing traffic passing through the network segment; (ii) analyzing respective system configurations of the one or more network security devices; and (iii) evaluating performance of the security policies based on the traffic.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3B depicts a user interface screen of a network security device illustrating exemplary goal profiles that can be assigned to one or more network devices in accordance with an embodiment of the present invention.

FIG. 4 depicts a compliance report illustrating exemplary security loopholes and/or critical issues in accordance with an embodiment of the present invention.

FIG. 5A depicts a performance recommendation report illustrating exemplary performance optimization recommendations in accordance with an embodiment of the present invention.

DETAILED DESCRIPTION

Figure 1:
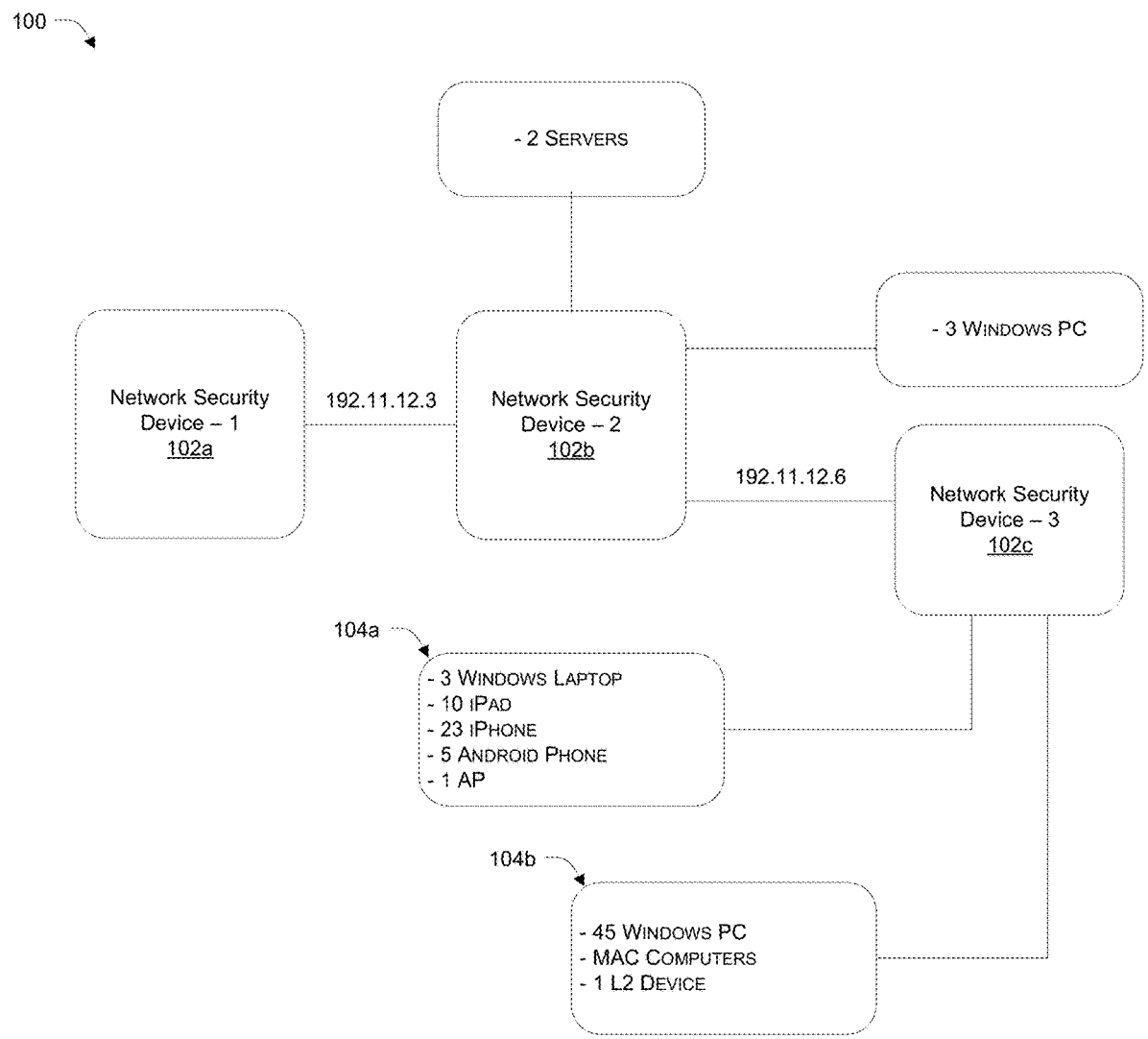
FIG. 1 illustrates an exemplary network topology that can be discovered during a learning phase in accordance with an embodiment of the present invention.

Systems and methods are described for monitoring compliance with security goals by a network or part thereof. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Systems and methods are described for monitoring compliance with security goals by a network or part thereof. Systems and methods are disclosed for monitoring compliance of pre-defined or given security goal(s) collectively or individually by one or more network devices, including but not limited to intrusion detection device, intrusion prevention device, content filtering device, anti-malware device, antispam device, Virtual Private Networking (VPN) enabling device, network traffic/event logging device, identity-based access control device, Data Leak Prevention (DLP) device, load balancing device, Quality of Service (QoS) monitoring device, SSL/SSH inspection device, application control device, endpoints, network assets, network security device (NSD), and network management device. Depending upon the particular implementation, the security goal and therefore the compliance checking may relate to and be performed for security policies configured within a network security device, system configuration, system performance (e.g., CPU load, memory load, etc.), data originating from other fabric members (e.g., wireless access points (APs), switches and clients), threat intelligence correlation and Representational State Transfer (REST)ful API calls originating from an external source.

The proposed system and method can learn network topology of a network segment of a network, learn security policies implemented on network devices that form part of the network segment, analyze traffic flow, configuration of the network segment and performance of the security policies, receive a security goal associated with the network segment and monitor if the security policies comply with the security goal based on the above learning and analysis. In an exemplary embodiment, a report highlighting non-compliance and reasons for non-compliance can be provided along with recommendations that can ensure compliance of the security goal.

In an aspect, the system can include a network topology learning module configured to enable discovery of network topology of at least one network segments of a network, and learn security policies implemented in network devices that form part of the at-least one network segment. The system can include a traffic flow and security policy analysis module configured to perform analysis of traffic for the at least one network segment, analysis of configuration of at least one network segment, and determine performance of the security policies. The system can further include a goal creation and association module configured to associate a security goal that can include at least one security rules to be associated with the at least one network segment, and a goal compliance module configured to check if the security polices, for example, comply with the at least one security rule of the security goal.

In some aspects, the system can further include a compliance reporting module configured to determine and report issues highlighting reasons for non-compliance, if the security polices do not comply with the at least one security rule of the security goal. In an aspect, the system can generate a report that can include the discovered topology of the at least one network segment, the associated security goal, the at least one security rule, the issues highlighting reasons for non-compliance, and the at least one recommendation. The system can report performance of the security polices with respect to analysis of the traffic.

In some embodiments, the system can further include a recommendation module that can generate at least one recommendation for change of the security polices based on the issues as determined. The recommendation module can be configured to generate recommendation for configuration optimization of the at least one network segment or a part thereof. System can select a suitable recommendation from list of recommendations pre-stored in a recommendation database. In an aspect, if the security polices do not comply with the at least one security rule of the security goal, the system can recommend and allow change/update of security polices to comply with the at least one security rule of the security goal.

In some embodiments, the system can include a topology discovery agent configured to enable the discovery of the topology of the at least one network segment of the network, and a network analysis agent configured to analysis the network traffic.

In some embodiment, the security goal can be assigned to different network segments based on any or a combination of user-based assignment, goals associated with other similar network segments, and attributes of the at least one network segment. In an aspect, the security policies can be associated with any or a combination of network devices, interfaces, and virtual domains (VDOMs) of the network devices.

In an aspect, the network can include multiple network devices, which can be represented as a network segmentation tree (NST), which may also be referred to interchangeably herein as a Cooperative Security Fabric (CSF), that spans across an entire network, using network telemetry to link different security devices, security sensors and tools together to collect, coordinate, and respond to different network activities in real time. Each intermediate node in the network may be aware of downstream network topology, along with being aware of its connected downstream network security devices, and its parent node. In an exemplary implementation, network topology can be discovered using a suitable network discovery protocol.

As those skilled in the art will appreciate based on the description provided herein, the NST can be constructed based on hierarchical interconnections among the multiple network devices deployed within a protected network by determining a relative position of each of the plurality of network devices within the NST based on at least one identifier associated with the respective network device. Each node of the NST can represent a network device of the plurality of network devices and each node of the NST, except a root node of the NST and leaf-nodes of the NST, may have one parent node and one or more child nodes. The nodes of the NST can be constrained to allow only a parent node to query its child nodes.

In some embodiments, different network devices can be configured to exchange information. For example, the network devices can exchange configuration information, performance related information, and information related to network topology discovery to enable comparison across the network.

In an aspect, the network devices can be any or combination of portable computing devices, network assets, network management devices, network security devices (NSDs), firewalls, routers, switches, access points, gateway devices, intrusion prevention systems (IPSs), and intrusion detection systems (IDSs), and Unified Threat Management (UTM) devices.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORTIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network topology 100 that can be discovered during a learning phase in accordance with an embodiment of the present invention. As shown in FIG. 1, network topology 100 is an arrangement of various network devices (connecting links, nodes, etc) of a computer network. A typical protected network may have several network devices, which may also be referred to interchangeably herein as network elements or network nodes, such as endpoints, network assets, network security devices, networking devices, databases, servers, utility devices, end user devices, portable computing devices, network assets, network management devices, network security devices, firewalls, routers, switches, access points, gateway devices, IPSs, IDSs, UTM devices and network management devices. Network topology provides a physical or logical representation of how these network devices are arranged or connected in the network. Depending on the various requirements of the protected network, these network devices can be arranged in a variety of different topologies, for example ring, mesh, start, fully connected, line, tree and bus. So, discovery of network topology may be required to understand where these network devices are placed relative to each other, what function these network devices are performing, and to understand interworking of different security measures (applied in the form of security policies) applied on a network, to ensure security compliance of a protected network with respect to a pre-defined or a given security goal, for example. As different network security measures take place at different layers on different network devices, discovery of network topology may be required to monitor and ensure compliance of security goals and ensure that the network devices, individually and/or collectively, are performing the required/desired security enabling functions in an efficient manner.

As shown in FIG. 1, network security device-1 102a can be connected to network security device-2 102b, which in-term can be connected to different servers (for example, 2 servers), end user devices (for example, 3 windows PCs), and another network security devices-3 102c. Network security device-3 102c can be connected to different network devices of different network segments, for example network segment 104a, and network segment 104b. As shown in here, each network segments may include multiple network devices. For example, network segment 104a may have windows laptops, 10 iPads, 23 iPhones, 5 Android phones, and 1 Access Point (AP) and network segment 104b may have 45 Windows PCs, several MAC computers, and 1 layer-2 network device. Each of the network security device-1 102a, network security device 102b and network security device 102c, collectively and interchangeably referred as network security devices 102, may have security measures implemented to prevent the network or the part thereof from different vulnerabilities.

Figure 2:
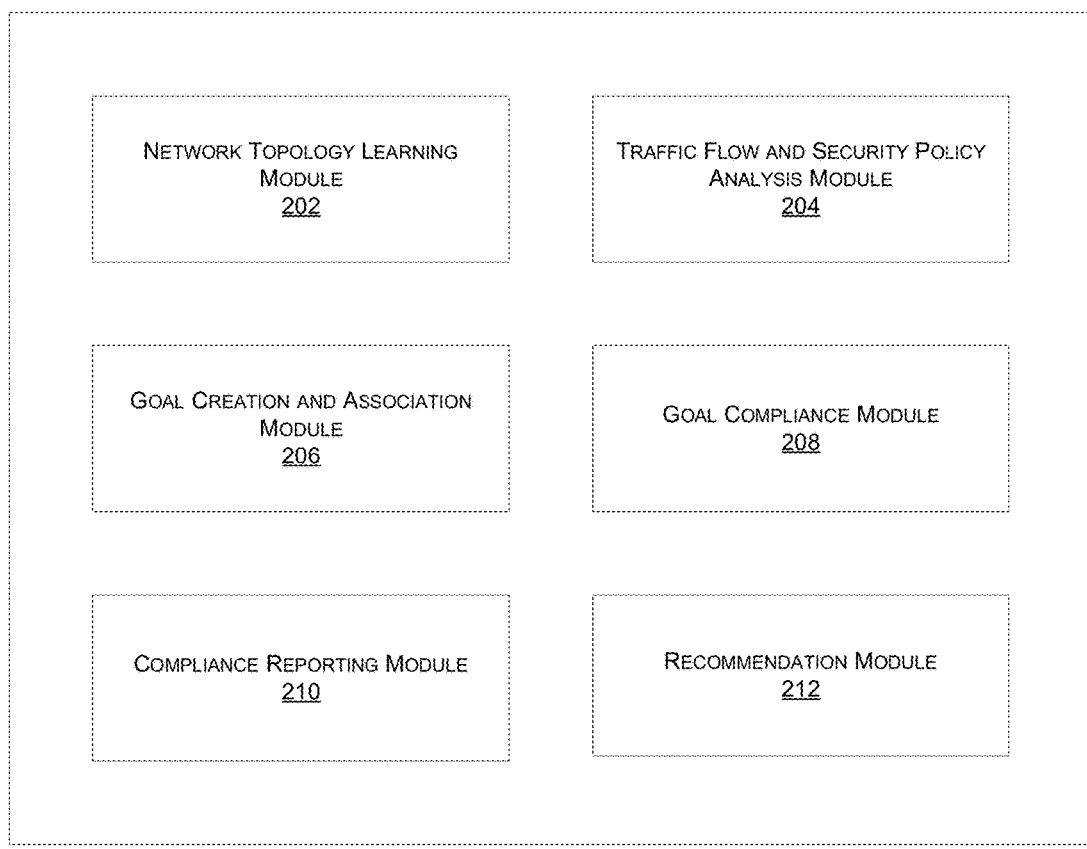
FIG. 2 illustrates exemplary functional modules of a system for monitoring compliance with security goals by a network or a part thereof in accordance with an embodiment of the present invention.

FIG. 2 illustrates exemplary functional modules of a system for monitoring compliance with security goals by a network or a part thereof in accordance with an embodiment of the present invention. System 200 can learn network topology of a network segment of a network, learn security policies implemented on network devices that form part of the network segment, analyze traffic flow, configuration of the network segment and performance of the security policies, receive a security goal associated with the network segment and monitor if the security policies comply with the security goal based on above learning and analysis.

In an exemplary embodiment, system 200 can include a network topology learning module 202 configured to enable discovery of topology of at least one network segment of a network, and learn security policies implemented in network devices that form part of the at-least one network segment.

In an exemplary implementation, system 200 can use a network segment tree (NST), which may also be referred to interchangeably herein as a Cooperative Security Fabric (CSF), that spans across an entire network, using network telemetry to link different security devices, security sensors and tools together to collect, coordinate, and respond to different network activities in real time. Each intermediate node in the network may be aware of downstream network topology, along with being aware of its connected downstream network security devices, and its parent node. In an exemplary implementation, network topology can be discovered using a suitable network discovery protocol.

Module 202 can determine how different network security devices are connected to each other, where they are located and other such attributes of the network devices. In an exemplary implementation, a network traffic log can be used to determine the types of network devices. For example, using the traffic log, module 202 can determine whether a network device is a router, a switch, a NAT device, or an end user device. For example, if traffic coming from a network device indicates different source Internet Protocol (IP) addresses but one MAC address, the module 202 can determine that the traffic is coming from a router. Similarly, if the traffic specifies one MAC address, one IP address but changing device type, module 202 can determine that the traffic is coming from a Network Address Translation (NAT) device. Module 202 can discover the network topology and present a graphical representation of the network arrangement. In an exemplary embodiment, module 202 can enable a user to browse-through the network using a user interface. In an exemplary implementation, the browse-through user interface can allow a user to see different malware that has been detected, infected network devices, infected network segments, and all such threats/vulnerabilities in the network.

In an exemplary implementation, network topology learning module 202 can store network topology information in a network segmentation tree (NST) format. In an implementation, the NST can be constructed based on analysis of the hierarchical interconnections among multiple network devices deployed within a protected network by determining a relative position of each of the network devices within the NST based on at least one identifier associated with the respective network device. In some embodiments, different network devices can be configured to exchange information. For example, the network devices can exchange configuration information, performance related information, and information related to network topology discovery to enable comparison across the network. Network topology can be discovered accordingly. In another aspect, the CSF can be constructed by determining relative positions of each network security device within the CSF based on at least one identifier, such as an IP address, a type of NSD, the serial number of the NSD, a manufacturing year/date/time of the NSD, functionality of the NSD, location/position/configuration of the NSD in the network, importance of the NSD in the network, among other like parameters. Each network security device, except root node network security device and leaf-node network security devices, can be configured to have a single parent node and one or more child nodes, and each NSD of the CSF can be constrained to allow queries to be issued only in the downstream direction.

The network topology learning module 202 can be configured to learn security policies implemented in network devices that form part of the at-least one network segment. A suitable protocol or API, for example a REST API can be used to exchange information among network devices.

System 200 can include a traffic flow and security policy analysis module 204 configured to perform analysis of traffic for the at least one network segment, analysis of configuration of at least one network segment, and determine performance of the security policies. Module 204 can analyze the traffic flow and determine where and how different network security policies are being applied. Module 204 can analyze which features, ports, security measures are enabled or disabled on different network security devices associated a network segment. For a selected network segment, the system can perform analysis of security policies being executed at different network devices of the selected network segment. Module 204 can perform different analysis based on headers of packets or the traffic log.

In an aspect, system 200 can include a goal creation and association module 206 configured to associate a security goal that includes at least one security rules to be associated with the at least one network segment, a goal compliance module 208 configured to check if the security polices comply with the at least one security rule of the security goal.

In an exemplary implementation, module 206 can enable a user to define one or more security goals or select one or more security goals from a list of pre-configured security goals. For example, a security goal can relate to intrusion prevention, block BOTNET etc. Any security goals in the form of one or more security rules to be applied can be created and associated a network segment. As those of skill in the art will appreciate, for different network segments, different network goals can be created. For example, a network segment that include critical databases, servers etc of the organization may have different security goals as compared to the network segments that connect guest devices. Module 206 can enable an administrative user to create one or more security goals for a selected segment by recommending different security attributes and one or more security goals retrieved by a high scored network segments, which is similar to the selected network segment.

Further, based on discovery of the network topology by module 202 and various analysis of the network segment by module 204, the goal compliance module 208 can compare the one or more security goals with security policies being executed by different network device to determine if the required security goals are being met by the system or not. In an exemplary implementation, module 208 can generate test traffic and check if the traffic is being allowed or blocked by different network devices as intended according to the created security goals. Module 208 can determine network devices or network security policies that are in violation of the created security goals. The module 208 can check compliance of the created security goals individually or collectively by one or more network devices of a selected network segment. Module 208 can detect conflicts between the security policies being executed by the one or more network devices and the created security goals. In an exemplary implementation, module 208 can also determine potential issues, for example repeated security checks by different network devices, causing non-optimal network performance.

In some aspects, system 200 can further include a compliance reporting module 210 configured to determine and report issues highlighting reasons for non-compliance, if the security polices do not comply with the at least one security rule of the security goal. In an aspect, system 200 can generate a report that can include the discovered topology of the at least one network segment, the associated security goal, the at least one security rule, the issues highlighting reasons for non-compliance, and the at least one recommendation. System 200 can report performance of the security polices with respect to analysis of the traffic. The report can provide a graphical representation of network, highlighting network device, or causes of non-compliance.

In some embodiments, system 200 can further include a recommendation module 212 that can generates at least one recommendation for implementing a change to the security polices based on the issues as determined. Recommendation module 212 can be configured to generate a recommendation for configuration optimization of the at least one network segment or a part thereof. System 200 can select a suitable recommendation from a list of recommendations pre-stored in a recommendation database, for example. In an aspect, if the security polices do not comply with the at least one security rule of the security goal, system 200 can recommend and allow changes/updates to the security polices to comply with the at least one security rule of the security goal.

In an exemplary implementation, module 212 can recommend security policies being performed by different network devices of a network segment that are similar to the network segment for which system 200 has identified non-compliance for the same set of security goals. Module 212 can also recommend a change of security policies or configuration of network segment to remove redundancies. For example, if the same set of web-filtering is being applied at three different network security devices, module 212 can recommend the web-filtering be disable on two of the network security devices to improve network performance. Recommendation module 212 can provide different recommendations for adding/removing a network device, upgrading/downgrading a network device, reconfiguring a network device, editing security policies being executed by a network device and other such recommendation, to make the network segment comply with the security goals.

Figure 3A:
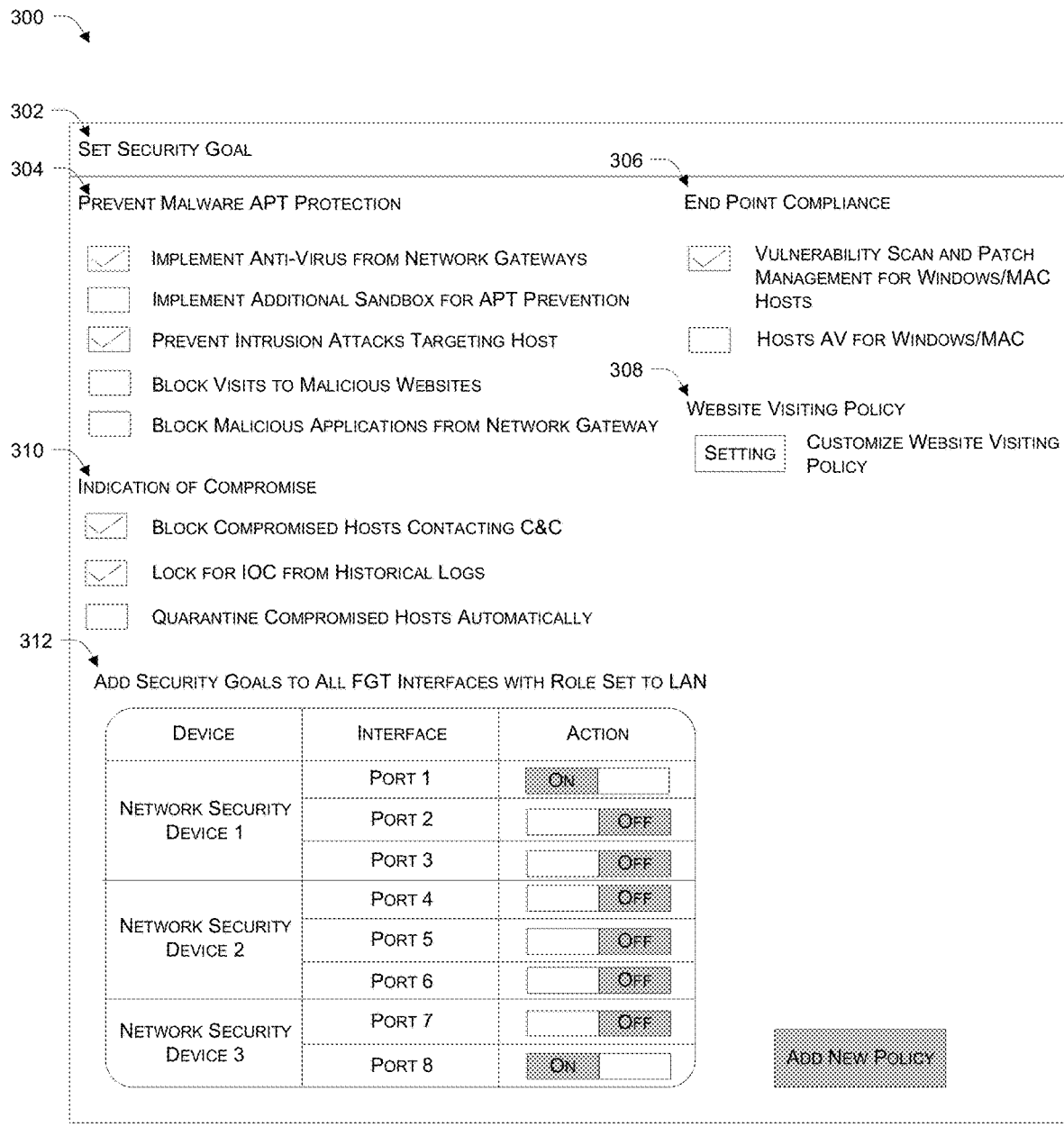
FIG. 3A depicts a user interface screen of a network security device illustrating exemplary security goals that can be set-up for a particular network or a part thereof for monitoring compliance in accordance with an embodiment of the present invention.

FIG. 3A depicts a user interface screen 300 of a network security device illustrating exemplary security goals that can be set-up for a particular network or a part thereof for monitoring compliance in accordance with an embodiment of the present invention. Illustrated here is an example user interface 300 with options to set a security goal 302. In an exemplary implementation, as shown in FIG. 3A, once a user selects a network or part thereof, a list of security goals depending on the characteristics of the network or part thereof can be suggested. The user can either select any one or those recommended security goals and edit them as per requirement or create a new security goal all together. As shown in FIG. 3A, the security goal can be "prevent Malware APT protection" 304. User can select from different options, for example, implement anti-virus from network gateways, prevent intrusion attack targeting host etc. Security goals can be created for a network security device or end user (referred interchangeably as end points). A user can select security goals that may be associated with endpoint compliance 306. For example, security goals can be vulnerability scan and patch management for Windows/MAC hosts. Another example, security goal can be related to website visiting policy 308. Yet another example of security goals can be related to indication of comprise 310. In an exemplary implementation, a user can apply different security goals for different interfaces, as shown by option 312. As one may appreciate, a security profile can include one or more security goals, wherein each security goals can include one or more security checks or security rules.

FIG. 3B depicts a user interface screen of a network security device illustrating exemplary goal profiles that can be assigned to one or more network devices in accordance with an embodiment of the present invention. As shown in FIG. 3B goal profiles 352 can include list of security goals to be applied on different network segments. Interface 350 lists profile names 356 for different network segments, for example LAN 358a and DMZ 358b. In an exemplary implementation, user can get options to assign security goals to different interfaces of a network device. For example, for a gateway device (e.g., a FORTIGATE gateway device), the user can assign the security goals, as shown by option 360. Security profiles 366 can be defined independently for each device 362, and for each interface 364. As shown in FIG. 3B, different security goals can be created for different interfaces/ports of the same network security device.

Based on the created security goals, the system can analyze the network and report compliance of the security goals by a selected network segment. FIG. 4 depicts a compliance report 400 illustrating exemplary security loopholes and/or critical issues in accordance with an embodiment of the present invention. As shown in FIG. 4, compliance report 400 can list network security device 402 that is non-complaint. Report 400 can also list interfaces, for example, LAN segment 404, that is non-compliant with one or more selected security goals. In an exemplary implementation, report 400 can specify/recommend preventive/corrective actions 406 to be taken to ensure compliance with the security goals. As illustrated, report 400 can list unprotected hosts, along with their identification and IP addresses. Report 400 can also include a graphical representation of issues and positions of the network devices causing the issues. Report 400 can include various recommendation for performance improvement of the network. For example, report 400 can recommend, to meet the vulnerability scan and patch management goal, installation of a network security device with all host in this network. Similarly, for another segment system report can include another recommendation. For example, to meet the host anti-virus goal, it may be recommended that network security measures be installed on all host in the network.

FIG. 5A depicts a performance recommendation report 500 illustrating exemplary performance optimization recommendations in accordance with an embodiment of the present invention. Performance recommendation report 500 can include different performance recommendations 504 for different network security devices 502. For example, a performance recommendation for network security device 1, may indicate "we have detected continuous high CPU and memory usage on this network security device, i.e. CPU average usage of 91% over past 24 hours, and memory average usage of 95% and hence recommend to upgrade this node to a higher capacity network security device". Similarly, for network security device 2, the recommendation may indicate "we have detected that traffic logging volume across all network devices exceeds the recommended log rate for your network device, i.e. actual log rate over past 24 hours is 15,501 logs/sec, and recommended log rate for FAZ 1000D is 12000 logs/sec, and hence we recommend upgrading to a higher end network device or use of collector analyzer mode with multiple network device to distribute the log collection". Similar recommendations can be provided based on analysis of the network traffic to ensure that the security goals are met and the network or part of the network is running in compliance of the security goals. In some implementations, performance bottlenecks can be reported with a suggestion to upgrade the nodes or the channels causing the bottleneck.

Figure 5B:
FIG. 5B depicts a configuration recommendation report illustrating exemplary configuration recommendations in accordance with an embodiment of the present invention.

FIG. 5B depicts a configuration recommendation report 550 illustrating exemplary configuration recommendations in accordance with an embodiment of the present invention. In some implementations, report 400 can include a configuration recommendation report 550. For each segment (for example, LAN segment 506) or network interface of network devices 504 separate recommendation summaries 508 can be provided. The user or network administrator can accept the recommendation by taking the recommended action 510. As shown in FIG. 5B, for network security device 1, port 1, the recommendation may indicate "to meet the network antivirus goal, we recommend to setup an anti-virus profiles on policies 1 and 14". Similarly for network security device 2, port 1, the recommendation can state "to meet malicious website blocking goal, we recommend to setup an anti-virus profile on policies 1 and 14, for network security device 3, across all ports, the recommendation might be "to meet the network antivirus goals, we recommend activating the anti-virus service on network security device 1500D and network security Device 60D. Similarly, suitable recommendations can be made for different network security devices to address perceived gaps in security with respect to identified security goals. Based on the comparison of security goals with the network security policy being executed by different network devices of a network segment, the proposed system can identify security gaps and recommend certain actions to be taken in order to ensure compliance with the security goals.

As suggested above, all non-compliances can be reported based on the comparison. A graphical representation, indicating the types of security gaps, recommended actions to address the gaps, and location of the network device where the gaps exist can be provided. The administrator can browse through different network segments to see if that network segment complies with the set security goals. In an exemplary implementation, the system can also score each segment of the network and provide a comparison with similar network segments of the sane network or another network.

In some embodiment, the reasons why a segment is scoring high can be provided to a network admin so that he/she can take similar measures to improve the security of the network segment that he/she is managing.

Figure 6:
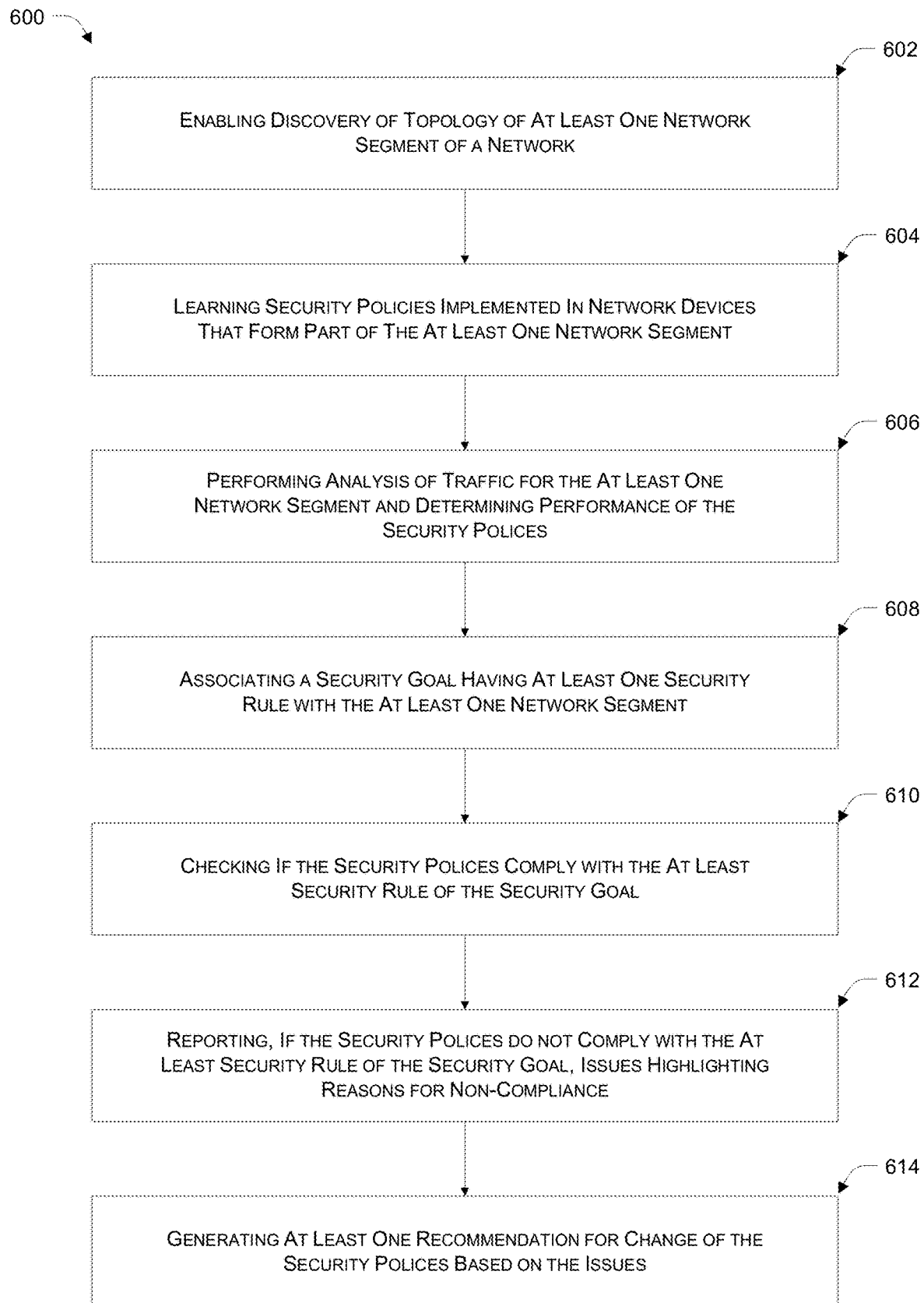
FIG. 6 illustrates exemplary steps of a method for monitoring compliance with security goals by a network or a part thereof in accordance with an embodiment of the present invention.

FIG. 6 illustrates exemplary steps of a method 600 for monitoring compliance with security goals by a network or a part thereof in accordance with an embodiment of the present invention. As shown in FIG. 6, monitoring compliance with security goals by a network or a part thereof can include the step of enabling discovery of topology of at least one network segment of a network, as shown at step 602, learning security policies implemented in network devices that form part of the at least one network segment, as shown at step 604, performing analysis of traffic for the at least one network segment and determining performance of the security policies, as shown at step 606, associating security goal having at least one security rule with the at least one network segment as shown at step 608, and checking if the security policies comply with the at least one security rule of the security goal, as shown at step 610. The method can also include steps of reporting issues, if the security policies don't not comply with at least one security rule of the security goal, highlighting reasons for non-compliance as shown ate step 612. In an exemplary implementation, the method includes steps of generating at-least one recommendation for change of the security policies based on the issued as reported, as shown at step 614.

In some implementations, discovery of topology of a network segment of a network can be performed using a suitable network discovery protocol. A detailed network topology provides information regarding the types of devices, identities of the devices, where these devices are relative to each other, how they are connected, what function they are performing, what security policies are being implemented on different network devices among other such details of the network and network devices. In a preferred implementation, a NST or a CFS can be constructed to represent one or more network segments and/or the entire enterprise network. In some implementations, security policies configured at different network devices can be also be learned during network discovery and the learning phase. To further understand the network and traffic flow, traffic logs as well as the live traffic can be analyzed and all the performance issues related to implementation of the security policies can be analyzed. Performance issues can include, but are not limited to, any bottlenecks, repetition of security policies by different network devices and other such issues associated with security policy execution.

In an exemplary implementation, for discovering network topology, for sharing intelligence in real-time and to get update on network traffic, network policies being implemented by network devices and other network activities across the network, a CSF can be build as described below. The CFS may span across an entire network, using network telemetry to link different security devices, security sensors and tools together to collect, coordinate, and respond to different network activities in real time.

Figure 7:
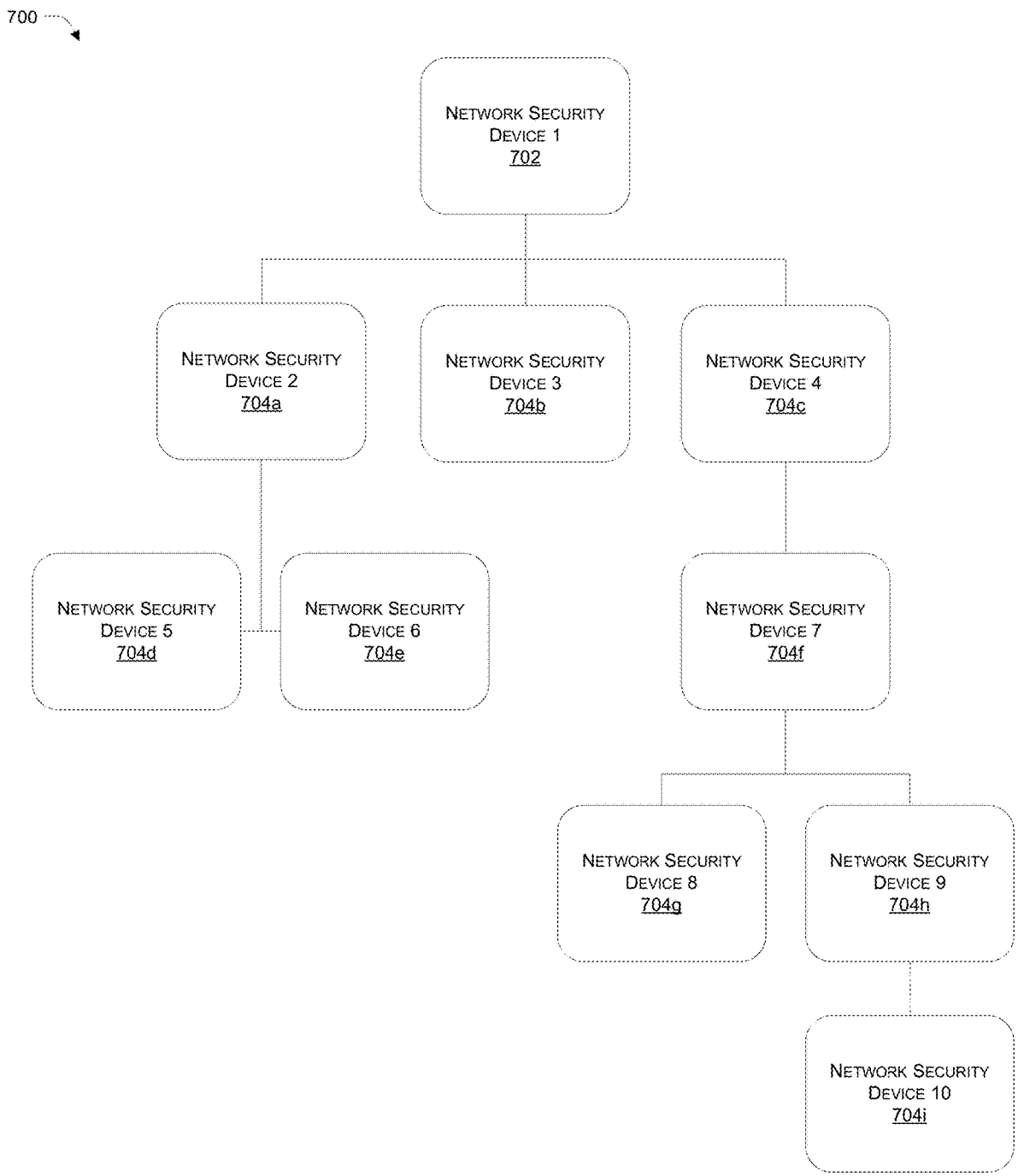
FIG. 7 illustrates an exemplary cooperative security fabric (CSF) created in accordance with an embodiment of the present invention.

FIG. 7 illustrates an exemplary cooperative security fabric 700 created in accordance with an embodiment of the present invention. In the simplified example illustrated by FIG. 7, CSF 700 includes one root node network security device, which may also be referred to interchangeably as the master network security device or root node, multiple intermediate node NSDs (i.e., NSD 2 704a, NSD 4 704c, NSD 7 704f, and NSD 9) 704h, and multiple leaf node NSDs (i.e., NSD 3 704b, NSD 5 704d, NSD 6 704e, NSD 8 704q, and NSD 10 704i). Each intermediate node NDS of CSF 700 may be aware of downstream network topology, along with being aware of its connected downstream network security devices, and its parent node. For instance, NSD 702 would be aware of the entire network topology, whereas NSD 2 704a would only be aware of its downstream nodes—NSD 5 704d and NDS 6 704e—and its parent, NDS 1 702.

According to one embodiment, CSF 700 can be dynamically constructed and maintained in a recursive way based on the downstream-upstream relationships defined by the hierarchical interconnection of the network security devices within the private network. For example, NSD 1 702, having no parent, may initially represent a CSF containing only one member. The other NSDs 704a-i, having one or more upstream NSDs, may join the CSF to which its parent belongs as described further below. Once CSF 700 stabilizes, the root node, i.e., NSD 1 702, has full information regarding CSF 700.

As noted above, NSDs participating within CSF 700 are permitted to issue queries to downstream NSDs participating within CSF 700. As such, NSD 2 704a may issue a query to either or both of NSD 5 704d and NSD 6 704e. In one embodiment, however, the CSF protocol precludes participating NSDs from issuing queries to upstream NSDs or NSDs that are not downstream from the NSD at issue. For example, in an embodiment in which such limitations are enforced by the CSF protocol, NSD 2 704a would not be permitted to issue a query to any of NSD 1 702, NSD 3 704b, NSD 4 704c, NSD 7 704f, NSD 8 704g, NSD 9 704h and NSD 10 704i.

As shown in FIG. 7, network security device 1 702, being the root note of the CSF 700, does not have a parent node and can be recognized as the master network security device within CSF 700. Nodes within CSF 700 can distinguish between being a leaf node and a root node in many ways, including whether they are directly coupled to more than one other node and whether they have a direct WAN connection. In addition to the permissible actions allowed to be performed by upstream network security devices (e.g., performing resource optimization for a downstream network security device and/or management of a downstream network security device), the master network security device has knowledge of the entire topology of the private network (not shown) within which CSF 700 is formed.

In an exemplary implementation, CSF 700 can be built in such a manner that each node of CSF 700 can request information regarding its downstream nodes and can send a query that may include an address of the destination node, a path to be followed from the source node (i.e., the node from which the query is originated) to the destination node, and query data. As those skilled in the art will appreciate, by making CSF 700, the root node, NSD 702, in the present example, becomes the master NSD and the other nodes in CSF 700 are fully aware of their respective downstream NSDs connected with them as well as their respective parent nodes. Each intermediate node NSD of the NST 700 may be aware of its parent NSD and child NSD(s). In the context of the present example, NSD 7 704 would be aware of its parent NSD 4 704c, and of its children NSD 8 704g and NSD 9 704h. In CSF 700, each node, except the root node NSD 702 and leaf nodes (i.e., NSDs 704d, 704e, 704b, 704g, and 704i), has one upstream node and one or more downstream nodes/NSDs. For instance, from the perspective of NSD 704a, NSD 702 represents an upstream node, and 704d and 704e represent downstream NSD nodes.

Each node of CSF 700 can be configured to be only aware of the nodes/NSDs directly connected with it. As those skilled in the art will appreciate, CSF 700 made in accordance with an embodiment of the present invention does not require election of a master NSD as the nodes/NSDs within CSF 700 that have a parent/upstream device recognize they are not the head/root/master of CSF 700 and the one node/NSD within CSF 700 that does not have a parent/upstream device recognizes itself as the head/root/master of CSF 700.

In an exemplary implementation, each node of CSF 700 may include one or more daemons, including a backend daemon and a forward daemon. In an exemplary implementation, the backend daemon running within a particular NSD can establish/create bidirectional tunnels between (i) the particular NSD and its parent, if any; and (ii) the particular NSD and each of its child nodes, if any. Further details regarding tunnel creation are described below with reference to FIG. 10. Each bidirectional tunnel can be configured to allow an upstream node/NSD to query a downstream node/NSD that it is connected to through the tunnel. Such a tunnel, in one exemplary configuration, can restrict the downstream node/NSD from sending queries to its upstream node/NSD. In general, when an upstream NSD queries a downstream NSD, the query is passed from the forward daemon of the upstream NSD (which may be referred to herein as an "up-level daemon") to the backend daemon of an intermediate NSD, if any, (which may be referred to herein as a "down-level daemon") and ultimately to the destination NSD. When the query reaches the destination NDS, the query is processed by the local backend daemon of the destination NSD. In this manner, queries may propagate downward toward the destination NSD in a recursive manner passing through the various intermediate up-level and down-level daemons as described further below. Similarly, responses to queries may propagate upward toward the originating NSD in a recursive manner passing through various intermediate down-level and up-level daemons.

For purposes of illustration, when node 704*c* queries node 704*h*, a first tunnel that has been created between node 704*c* and node 704*f* is initially used to pass the query from the forward daemon of node 704*c* to the backend daemon of node 704*f*. Then, the query is further passed from the forward daemon of NSD 704*f* to the backend daemon of NSD 704*h* via the tunnel established between NSD 704*f* and NSD 704*h*. Finally, at the destination (i.e., node 704*f*), the query is handled by local backend daemon.

In alternative embodiments, the communication channel between directly connected NSD can be implemented as two separate unidirectional tunnels, one for issuing commands, queries and/or keep-alive messages from an upstream node to a downstream node and one for returning responses to such commands, queries and/or keep-alive messages. Furthermore, while in the examples described herein, queries are described as flowing in a downstream direction, in some embodiments, downstream nodes may be allowed to query or update upstream nodes in one or more defined circumstances. For example, in one embodiment, responsive to accepting a join request from a new NSD, the NSD that has integrated the new NSD into its subtree may provide a topology update regarding its subtree to its parent via the tunnel connecting the two. In one embodiment, this topology update may be propagated all the way to the root of CSF 700.

In an exemplary implementation, the backend daemon running within each node of CSF 700 can be configured to create a tunnel or virtual link, for example, tunnel 706, between the upstream and downstream devices and handle one or more exceptions, if any. Backend daemon may also provide an Application Programming Interface (API), for example a Representational State Transfer (REST) or RESTful API, to the up-level daemon to enable queries to be received and processed by the backend daemon. In an exemplary implementation, each node of CSF 700 may have a forward daemon that is configured to enable query initiation and response processing. The forward daemon can initiate a query, which may include a destination address, a complete path from the source node to the destination node, for example, indicating the addresses of all intermediate nodes through which the query is to pass, and query data. As described in further detail with reference to FIG. 9, each intermediate node, upon receiving a query, identifies whether the query is destined to it and, if so, can accordingly process the query; otherwise, the intermediate node can forward the query towards the destination node based on the path defined in the query.

The bidirectional tunnels represented by the connections between the nodes in CSF 700 may be established during construction of CSF 700. Alternatively, they may be established on demand. In an exemplary implementation, when a query is initiated by an up-level daemon, the backend daemon of the source NSD can create the required tunnel between the source NSD and the next NSD, and similarly subsequent required tunnels can be created by other intermediate NSD(s) between themselves and their direct downstream NSD. When a query arrives at the destination node, backend daemon of the destination node can send the query by making an appropriate call via the local RESTful API and wait for the response. The destination NSD can then generate a response, which can be proxied back to each upstream device until it reaches the source NSD. As those skilled in the art will appreciate, no path is required for a response as each node of CSF 700 can only have one parent.

As such, a response can simply be propagated upstream until it reaches the source NSD that issued the corresponding query. An exemplary set of REST APIs is described in the attached Appendix.

In an exemplary implementation, for a given tree such as CSF 700, a group name and password associated with CSF 700 can be used to allow a new NSD to join CSF 700 and authenticate itself to its parent. In order to join CSF 700, a new NSD may send a join request, including the group name and password to the Internet Protocol (IP) address of its parent. Responsive to receipt of the join request, the parent NSD verifies the group name and password, and upon successful verification, the backend daemon of the parent NSD may establish a bidirectional tunnel with the new NSD and update the subtree rooted at itself to include the new NSD. As described further below, the tunnel is used for periodic keep-alive messages between parent and child and for on-demand query messages from parent to child.

In one embodiment, rather than reporting a topology change upward through CSF 100 responsive to acceptance of a join request, upstream NSDs can request topology information associated with the subtree of a downstream NSD on demand, for example, responsive to a network administrator requesting a refresh of a graphical user interface presented by the root NSD. For instance, with respect to FIG. 7, a new NSD (not shown) can send a join request to become a part of CSF 700 to NSD 704*b*, which upon, authentication and verification, can add the new NSD as its child node. Later, responsive to a query by NSD 1 702 requesting topology information, NSD 3 704*b* can provide topology information regarding its subtree. Alternatively, information about integration of a new NSD can be passed up to a root node NSD, which can then broadcast the information to other NSDs participating in CSF 700.

In an exemplary implementation, root node NSD, for example NSD 702 of NST 700, can information regarding the entire topology of CSF 700 by sending a query requesting topology information regarding the subtrees of each of its children. Upstream NSDs can be aware of the identity of each NSD, its type, capabilities, resources etc. and tunnel/virtual links. Identity of each NSD, its type, capabilities, resources etc. and the tunnel/virtual links created between the NSDs can be transparent.

Figure 8:
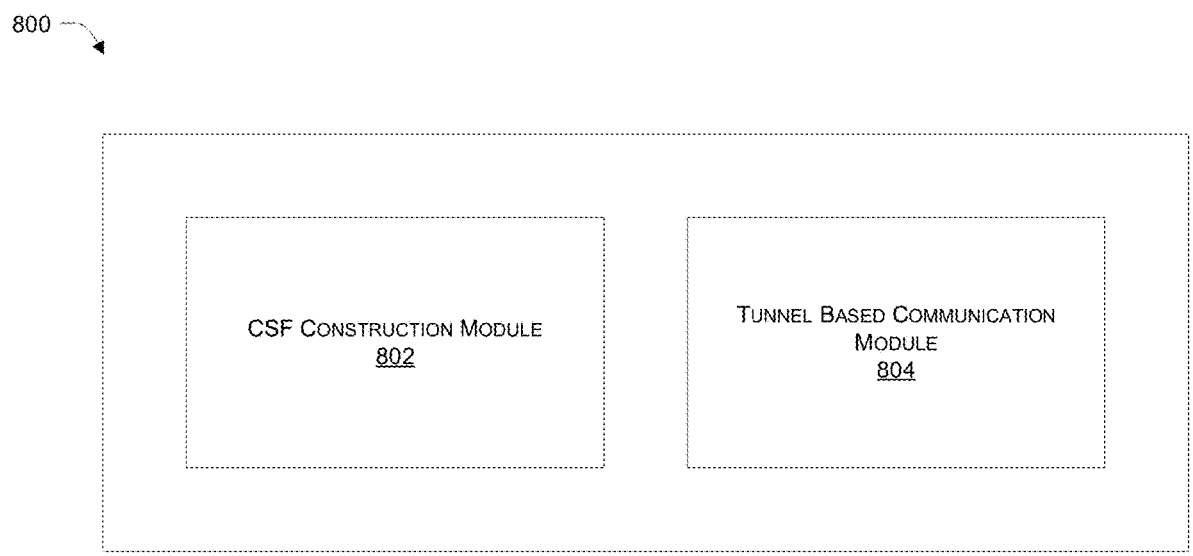
FIG. 8 illustrates exemplary functional modules of a network security device for dynamically forming a cooperative security fabric in accordance with an embodiment of the present invention.

FIG. 8 illustrates exemplary functional modules of a network security device (NSD) 800 for dynamically forming a CSF in accordance with an embodiment of the present invention. In this simplified example, NSD 800 may include a CSF construction module 802 and a tunnel based communication module 804, which together can be used by NSD 800 be used for dynamically forming a CSF (e.g., CSF 700) that can enable each NSD forming part of the CSF to be aware of the network topology of its downstream devices and enable resource optimization (e.g., firewall policy optimization and/or logging optimization) of downstream NSDs. Depending upon the particular implementation, NSD 800 may represent a gateway device, a firewall device, an Intrusion Detection System (IDS), an Intrusion Prevention Systems (IPS) and/or a Unified Threat Management (UTM) device.

Collectively, CSF construction module 802 of each of the NSDs within a private network dynamically constructs a CSF based on the hierarchical interconnections among them by determining its relative position as a root, intermediate or leaf node. As noted above, NSDs may send join requests to their parents to join the CSF in which their parents are participating. While the examples described herein may be described with reference to a single CSF within a private network, it is contemplated that network security devices may be divided into multiple CSFs and may participate in a single CSF or multiple CSFs.

Tunnel based communication module 804 establishes tunnels between NSD 800 and its parent, if any, and each of its children, if any. Tunnel based communication module 804 also enables communication of periodic keep-alive messages and on-demand query messages among parent nodes and their respective child nodes. As noted above, the tunnels may be established by a backend daemon (now shown) running on NSD 800 and NSD 800 may issue queries or commands to down-level daemons via a forward daemon (not shown) running on NSD 800.

In an aspect, CSF construction module 802 can be configured to dynamically construct a CSF based on hierarchical interconnections among multiple network security devices deployed within a protected network. In another aspect, the CSF can be constructed by determining relative positions of each network security device within the CSF based on at least one identifier, such as an IP address, a type of NSD, the serial number of the NSD, a manufacturing year/date/time of the NSD, functionality of the NSD, location/position/configuration of the NSD in the network, importance of the NSD in the network, among other like parameters. Each network security device, except root node network security device and leaf-node network security devices, can be configured to have a single parent node and one or more child nodes, and each NSD of the CSF can be constrained to allow queries to be issued only in the downstream direction.

In an exemplary implementation, the at least one identifier that is associated with each NSD can be the IP address, type of NSD, hierarchy of NSD with respect to each other or with respect to OSI model, configuration/serial number/location of the NSD, among any other identifier attribute of the NSD.

In an aspect, tunnel based communication module 804 can be configured to establish, by a backend daemon running on NSD 800, a tunnel between a directly connected upstream network security device (not shown), if any, and each directly connected downstream NSD (not shown), if any.

Communication module 804 can further be configured to enable communication of periodic keep-alive messages and on-demand query messages among the upstream network security device and the one or more downstream network security devices of the particular node. In an exemplary implementation, each network security device participating in the CSF can be configured to be aware of only those of the network security devices that are directly connected to it. By limiting the awareness of the NSD devices in the CSF, better efficiency in term of network routing, security, and management can be achieved.

In another aspect, the proposed CSF forming system can configure each NSD node in such a way that one or more downstream network security devices of a particular NSD of the NST cannot query the particular NSD (which is the upstream network security device for the downstream NSDs). The system can therefore configure each NSD so as to restrict an upstream NSD from being queried by a NSD that is lower in the CSF hierarchy.

In an exemplary implementation, the root node NSD can be aware of complete topology of the NST by means of one or more local daemons configured within each NSD. The root node NSD does not have any upstream NSD attached therewith, and similarly, leaf node NSDs do not have any downstream NSDs attached thereto. The root node NSD can act as master NSD, and can perform various network management and resource optimization functions in the network or in the CSF.

Figure 9:
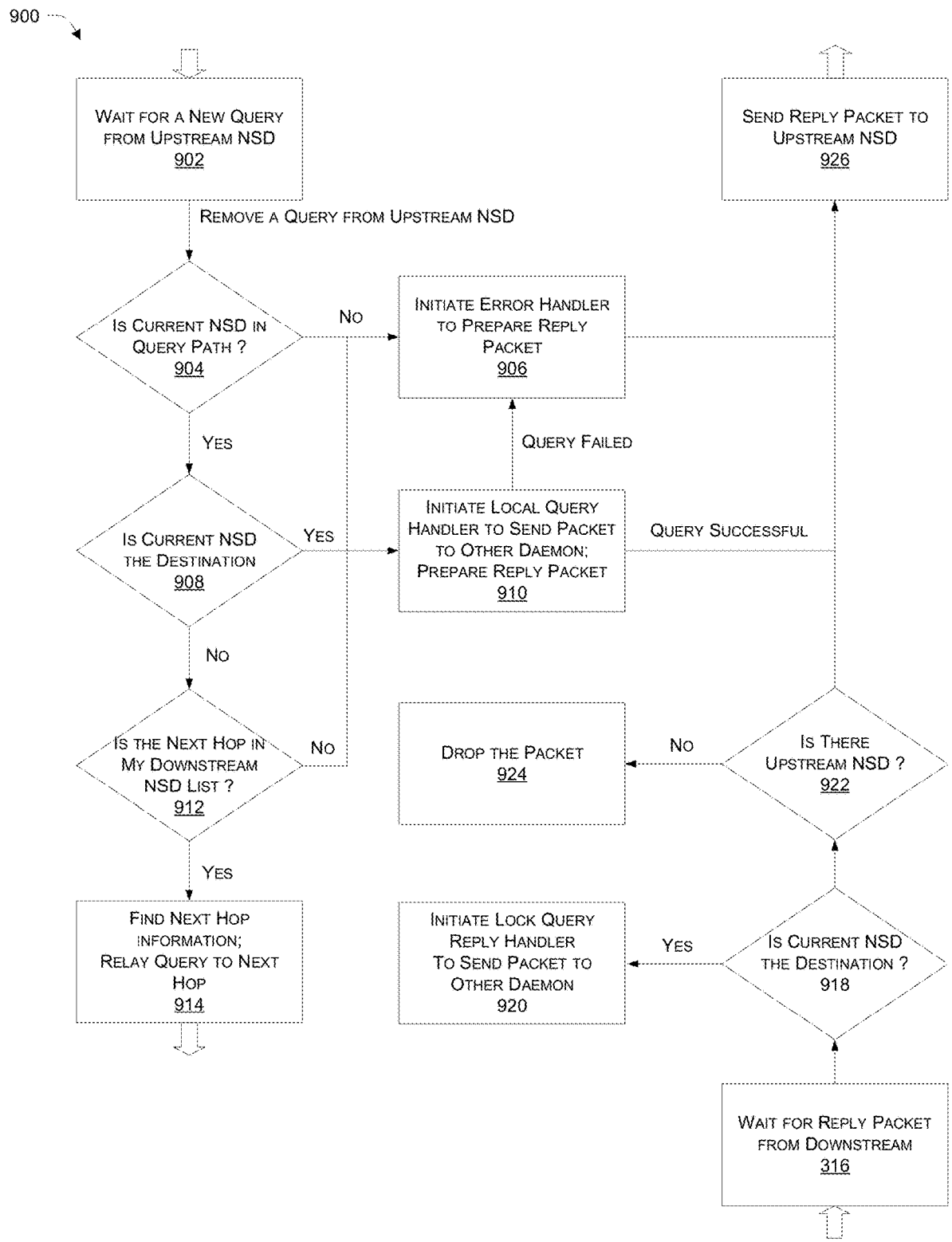
FIG. 9 is a flow diagram illustrating query handling by a network security device in accordance with an embodiment of the present invention.

FIG. 9 illustrates an exemplary flow of query handling by an NSD of a CSF in accordance with an embodiment of the present invention. According to one embodiment, each NSD implements two separate daemons—one, the forward daemon, which, among other things, issues queries to downstream NSDs and receives and routes responses to queries received from downstream NSDs, and another, the backend daemon, which, among other things, receives and processes queries from upstream NSDs (via a RESTful API, for example). In an exemplary implementation, each NSD can be configured to handle query and response packets based on the content of the respective packet and the specified query or return path. In an exemplary implementation, the response packet can include the destination address (which is the same as the source address of query packet), a return path including addresses of intermediate node(s)/hop(s)/NSD(s) through which it needs to be routed, along with the response data. In an exemplary implementation, return path and the query path can be same or different. In an exemplary implementation, communication between upstream and downstream NSDs can be enabled through a tunnel created by the current NSD.

As shown in FIG. 9, a particular NSD can wait for a new query from an upstream NSD, as shown at block 902. When the particular NSD receives the query that has a defined query path indicating the identities of intermediate NSDs, the destination NSD(s), and query data, it can check whether the current/particular NSD is in the query path, as shown at decision block 904. When the particular NSD is in the query path, it can further determine whether the current NSD is the destination NSD, as shown at decision block 908.

When the particular NSD is not in the query path, an error handler can prepare a reply packet, as shown at block 906, and send the reply packet to the upstream NSD as shown at block step 926.

When the current NSD is the destination NSD, a local query handler can be instantiated to handle the query and to cause the local forward daemon to prepare and send the reply packet upstream to the originator of the query as shown at block 910, wherein the forward daemon can send the reply packet to the upstream NSD, as shown at block 926. When the current NSD determines that it is not the destination NSD, it can determine whether the next hop NSD in the query path is in its downstream NSD list, as shown at decision block step 912. When the current NSD determines that the next hop is in its downstream NSD list, it can find the next hop information and relay the query to the next hop/downstream NSD as shown at block 914; otherwise, an error handler is initiated to prepare a reply packet to be sent back to the upstream NSD as shown at block 906.

In an exemplary implementation, the current NSD can also be configured to process response/reply packets received from a downstream NSD and make forwarding decisions to forward the responses/replies to an upstream NSD. As shown at block 916, the current NSD can wait for a reply packet to be received from a downstream NSD connected to it, determine whether the current NSD is the destination NSD for the received response, as shown at decision block 918. When the current NSD is the destination NSD, a local query reply hander can be initiated to send the packet to the other daemon—the up-level daemon—that is responsible for taking an appropriate action as shown at block 920; otherwise, the current NSD can determine whether there is an upstream NSD connected with the current NSD as shown at decision block 922. When the current NSD does not have an upstream NSD connected thereto, it can drop the response packet as shown at block 924; otherwise, it can send the response/reply packet to the upstream NSD as shown at block 926.

Figure 10:
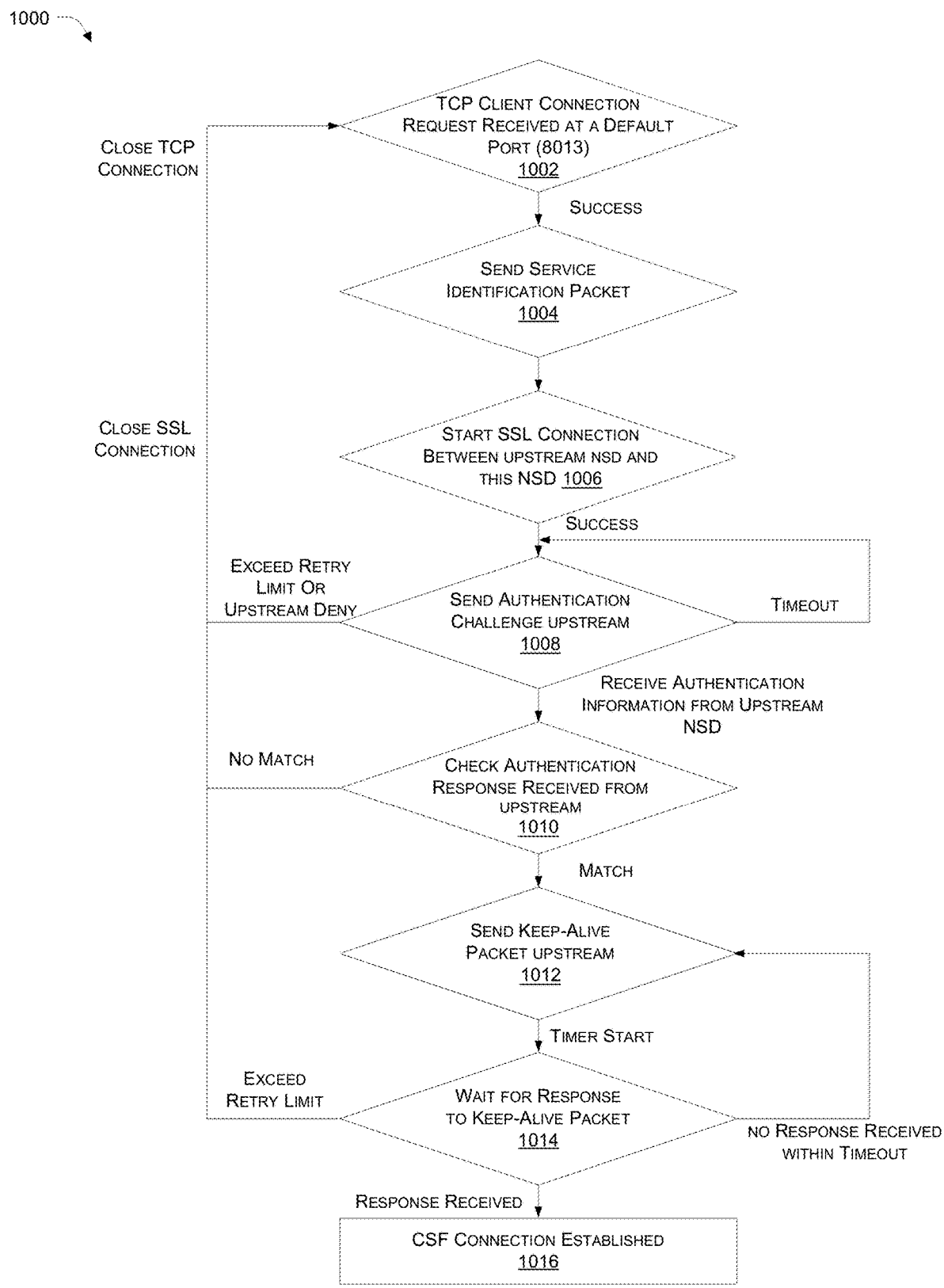
FIG. 10 is a flow diagram illustrating a downstream view of tunnel creation between two network security devices by a backend daemon in accordance with an embodiment of the present invention.

FIG. 10 illustrates an exemplary downstream view of tunnel creation between two NSDs by a backend daemon in accordance with an embodiment of the present invention. As shown in FIG. 10, an NSD can be configured to listen for a Transmission Control Protocol (TCP) client connection request on a default port, for example port 8013, as shown at decision block 1002, and send a service identification packet, as shown at block 1004. In an exemplary implementation, the TCP client connection request may be generated by the up-level daemon of the NSD or by a stream NSD. On successful identification of the service and compatibility of the network, the NSD can start a Secure Sockets Layer (SSL) client connection, as shown at block 1006 between the NSD and the TCP client, which can be a new NSD or an upstream NSD. The NSD can send an authentication challenge to the TCP client, and wait for the TCP client to provide authentication details (for instance, including a group name for the CSF and a corresponding password), as shown at block 1008. If the TCP client does not respond to the authentication challenge within a predefined timeout period associated with the authentication challenge, a timeout can occur and the NSD can resend the authentication challenge to the TCP client. When the NSD does not receive a response or the authentication response is not accurate after the retry limit has been exceeded, the NSD can close the SSL connection between the TCP client and the NSD and close the TCP connection request. When the authentication response is received from the client device, the NSD can check authentication information received from the client device to verify authenticity of the client device, as shown at decision block 1010. When the authentication information matches with the authentication credentials of the CSF of which the NSD is a part, the NSD can send keep-alive packet to the client device as shown at step 1012, and wait for acknowledgement of the keep alive packet from the client device (upstream NSD) as shown at decision block 1014. Upon receiving acknowledgement of the keep-alive packet, the CSF connection between the client device (the upstream NSD) and the current NSD can be established, as shown at block 1016.

Figure 11:
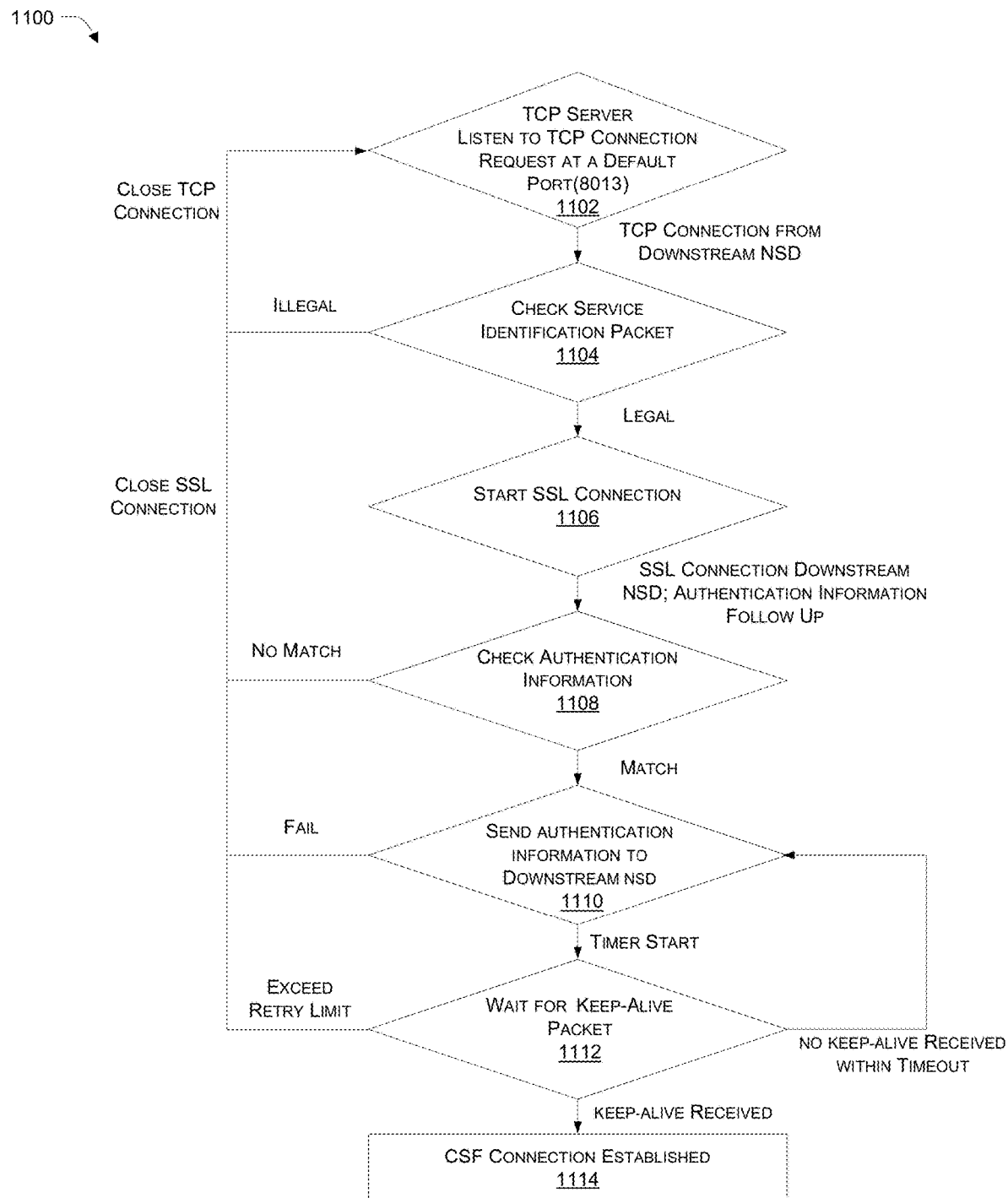
FIG. 11 is a flow diagram illustrating an upstream view of tunnel creation between two NSDs in accordance with an embodiment of the present invention.

FIG. 11 illustrates an exemplary upstream view of tunnel creation between two NSDs in accordance with an embodiment of the present invention. As shown in FIG. 11, a TCP server, for example an NSD can be configured to listen to a TCP connection request from a downstream NSD, on a default port, for example port 8013, as shown block 1102. Upon receiving the connection request from the downstream NSD, the NSD can check service identification packet, as shown at block 1104, and if the server identification packet is legal, the NSD can start an SSL connection between the downstream NSD and the NSD as shown at block 1106. When the service identification packet is illegal, the connection can be closed by the NSD. After starting the SSL connection, the NSD can check if the authentication information received from the downstream NSD matches with the CSF authentication credentials. In an exemplary implementation, if the authentication information provided by the downstream NSD matches with the CSF authentication credentials, the NSD can send its authentication information to the downstream NSD as shown at block 1110, and wait for a keep-alive packet, as shown at decision block 1112. In an exemplary implementation, the NSD can close the SSL connection and terminate the connection request when a response to the keep-alive packet is not received within a predefined or configurable retry limit. On receiving the response to the keep-alive packet, the NSD can confirm the tunnel as show at block 1114.

Figure 12:
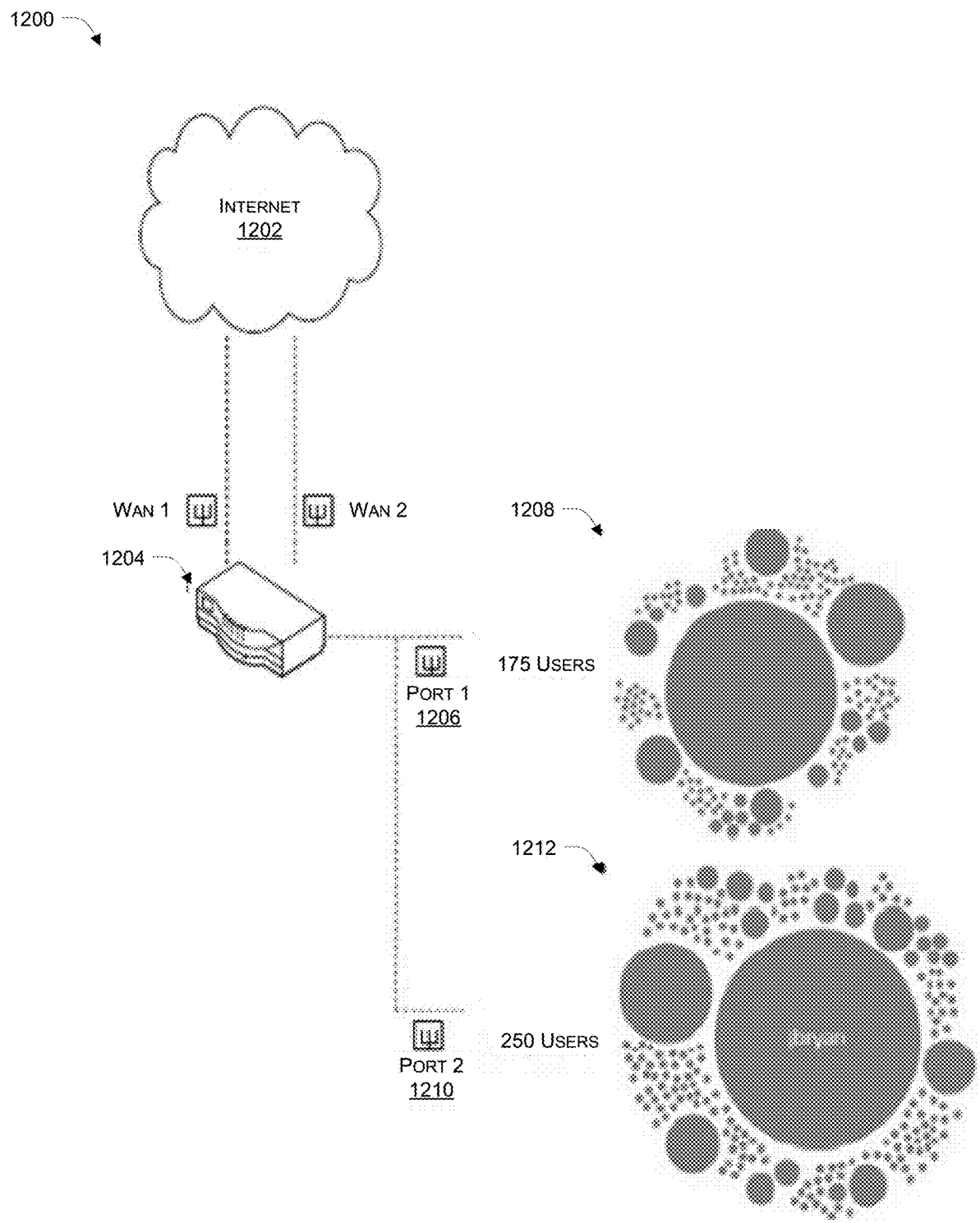
FIG. 12 illustrates a visual representation of NSDs associated with a private network arranged as a CSF in accordance with an embodiment of the present invention.

FIG. 12 illustrates an exemplary visual representation of a plurality of NSDs on a network that is arranged as a CSF in accordance with an embodiment of the present invention. System 800 can be used for creating the CSF, which can be visually represented as shown in FIG. 12. The CSF created by the proposed CSF construction system can be used for accurately representing the connected NSDs and other network devices within the network protected by NSD 1204, shown here as bubble dots. FIG. 12 shows an NSD 1204 being connected to Internet 1202 at one end, and with a plurality of other NSDs through its different ports such as port 1 1206 and port 2 1210. Each port may be communicatively coupled to a plurality of network devices. For example, port 1 1208 is shown connected to 175 distinct users through various intermediate network devices, and port 2 1210 connects to 250 distinct users through some other intermediate network devices. Using the proposed CSF construction system, as soon as a new network device gets connected with the NSD 1204, a new bubble can be created to present the new NSD and similarly when an NSD leaves the CSF, a bubble can be deleted. In an exemplary implementation, a CSF of a plurality of network devices can be created at different levels, for example at a LAN, WAN, MAN level or at a global level.

In an exemplary embodiment, the system of the present disclosure can create the CSF and configure each participating NSD to query, configure, and/or perform resource optimization for downstream network devices and/or downstream NSDs.

As those skilled in the art will appreciate, NSDs are connected with other devices within the protected network. so, while various usage scenarios described herein relate to communication and use of configuration of and/or security policies implemented by NSDs, alternatively or additionally, other devices connected to the CSF by virtue of being connected to one of the participating NSDs can provide information about themselves (e.g., their respective configurations and/or information regarding results of local processes) that can be acted upon by one or more of the participating NSDs. As such, information gathered regarding other endpoints (including endpoint security solutions running thereon, such as the FORTICLIENT endpoint protection suite available from the assignee of the present invention), network devices (e.g., wireless access points and wireless access point controllers) and/or network management/reporting devices (e.g., logging, analyzing and/or reporting appliances, such as one of the FORTIANALYZER family of network security reporting appliances) may be used and acted upon by the CSF. For example, an endpoint connected to the CSF may implement an endpoint security suite that has the ability to perform a vulnerability scan on the endpoint. The results of the vulnerability scan can be provided to the CSF, which can then take one or more actions based on that information (e.g., quarantining the endpoint, applying one or more patches to the endpoint, recommending or causing to be installed an update to the operating system of the endpoint, recommending or implementing one or more security policies relating to the endpoint and the like). Therefore, the CSF allows analysis of any information associated with or produced by any part of the CSF as part of the overall policy monitoring and one or more actions can be taken based on the results of the analysis.

Figure 13:
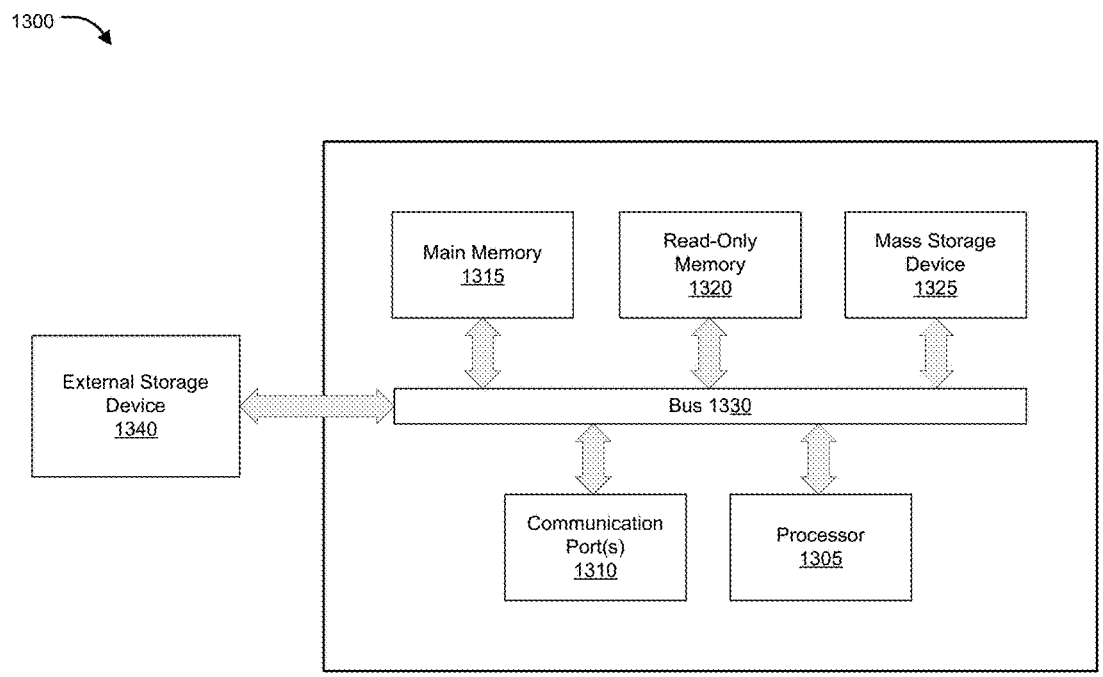
FIG. 13 illustrates an exemplary computer system in which or with which embodiments of the present invention may be utilized.

FIG. 13 is an example of a computer system 1300 with which embodiments of the present disclosure may be utilized. Computer system 1300 may represent or form a part of an NSD (e.g., NSD 702, 704a-i, 200 or 1204). The computer system 1300 can be configured to implementation, system 200 and execute steps of method 600 as illustrated above.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1300 includes a bus 1330, a processor 1305, communication port 1310, a main memory 1315, a removable storage media 1340, a Read-Only Memory (RAM) 1320 and a mass storage 1325. A person skilled in the art will appreciate that computer system 1300 may include more than one processor and communication ports.

Examples of processor 1305 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1305 may include various modules associated with embodiments of the present invention.

Communication port 1310 can be any of an RS-232 port for use with a modem based dialup connection, a 10/100 Ethernet port, a Gigabit or 10 Gigabit port using copper or fiber, a serial port, a parallel port, or other existing or future ports. Communication port 1310 may be chosen depending on a network, such a Local Area Network (LAN), Wide Area Network (WAN), or any network to which computer system 1300 connects.

Memory 1315 can be Random Access Memory (RAM), or any other dynamic storage device commonly known in the art. Read only memory 1320 can be any static storage device(s) such as, but not limited to, a Programmable Read Only Memory (PROM) chips for storing static information such as start-up or BIOS instructions for processor 1305.

Mass storage 1325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1330 communicatively couples processor(s) 1305 with the other memory, storage and communication blocks. Bus 1330 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1305 to system memory.

Optionally, operator and administrative interfaces, such as a display, keyboard, and a cursor control device, may also be coupled to bus 1330 to support direct operator interaction with computer system 1300. Other operator and administrative interfaces can be provided through network connections connected through communication port 1310.

Removable storage media 1340 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

While embodiments of the present disclosure have been illustrated and described with reference to some FIGs and embodiments, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
discovering, by a network security device of a plurality of network security devices of a private network, a topology of a network segment of the private network by participating in dynamic construction of a cooperative security fabric (CSF) interconnecting the plurality of network security devices in a form of a tree, having a plurality of nodes each representing one of the plurality of network security devices, based on hierarchical interconnections between the network security device and one or more directly connected upstream and downstream network security devices of the plurality of network security devices;
learning, by the network security device, security policies implemented by one or more network security devices of the plurality of network security devices that form part of the network segment based on the CSF; and
determining, by the network security device, whether the one or more network security devices are compliant with a security goal associated with the network segment by:
analyzing traffic passing through the network segment;
analyzing respective system configurations of the one or more network security devices; and
evaluating performance of the security policies based on the traffic.

2. The method of claim 1, wherein the security goal specifies at least one security rule and wherein the method further comprises when the security policies do not comply with the at least one security rule, then reporting, by the network security device, issues highlighting reasons for non-compliance.

3. The method of claim 2, further comprising generating, by the network security device, at least one recommendation for a change proposed to be made to the security polices based on the issues.

4. The method of claim 3, further comprising generating, by the network security device, recommendations for configuration optimization of the at least one network segment or a part thereof based on said analyzing respective system configurations of the one or more network security devices.

5. The method of claim 2, further comprising reporting, by the network security device, findings regarding performance of the security polices with respect to said analyzing traffic passing through the network segment.

6. The method of claim 3, wherein the at least one recommendation is pre-stored in a recommendation database.

7. The method of claim 2, wherein when the security polices do not comply with the at least one security rule, then causing, by the network device, the security polices to be updated so as to comply with the at least one security rule.

8. The method of claim 1, wherein the security goal is assigned to the network segment based on any or a combination of user-based assignment, goals associated with other similar network segments and attributes of the network segment.

9. The method of claim 1, wherein the plurality of network security devices are selected from one or a combination of a firewall, a gateway, an intrusion prevention system (IPS), an intrusion detection system (IDS), and a Unified Threat Management (UTM) appliance.

10. A non-transitory machine readable medium having embodied thereon instructions, which when executed by a processor of a network security device of a plurality of network security devices, cause the processor to perform a method comprising:
discovering a topology of a network segment of a private network by participating in dynamic construction of a cooperative security fabric (CSF) interconnecting the plurality of network security devices in a form of a tree, having a plurality of nodes each representing one of the plurality of network security devices, based on hierarchical interconnections between the network security device and one or more directly connected upstream and downstream network security devices of the plurality of network security devices;
learning security policies implemented by one or more network security devices of the plurality of network security devices that form part of the network segment based on the CSF; and
determining whether the one or more network security devices are compliant with a security goal associated with the network segment by:
analyzing traffic passing through the network segment;
analyzing respective system configurations of the one or more network security devices; and
evaluating performance of the security policies based on the traffic.

11. The non-transitory machine readable medium of claim 10, wherein the security goal specifies at least one security rule and wherein the method further comprises when the security policies do not comply with the at least one security rule, then reporting, by the network security device, issues highlighting reasons for non-compliance.

12. The non-transitory machine readable medium of claim 11, wherein the method further comprises generating at least one recommendation for a change proposed to be made to the security polices based on the issues.

13. The non-transitory machine readable medium of claim 12, wherein the method further comprises generating recommendations for configuration optimization of the at least one network segment or a part thereof based on said analyzing respective system configurations of the one or more network security devices.

14. The non-transitory machine readable medium of claim 11, wherein the method further comprises reporting findings regarding performance of the security polices with respect to said analyzing traffic passing through the network segment.

15. The non-transitory machine readable medium of claim 11, wherein the method further comprises when the security polices do not comply with the at least one security rule, then causing, by the network device, the security polices to be updated so as to comply with the at least one security rule.

16. The non-transitory machine readable medium of claim 10, wherein the security goal is assigned to the network segment based on a security goal associated with a similar network segment within the private network.

17. The non-transitory machine readable medium of claim 10, wherein the plurality of network security devices are selected from one or a combination of a firewall, a gateway, an intrusion prevention system (IPS), an intrusion detection system (IDS), and a Unified Threat Management (UTM) appliance.

18. A network security device comprising:
a processor; and
a non-transitory computer-readable medium, coupled to the processor, having stored therein instructions that when executed by the processor cause the processor to perform a method comprising:
discovering a topology of a network segment of a private network including a plurality of network security devices by participating in dynamic construction of a cooperative security fabric (CSF) interconnecting the plurality of network security devices in a form of a tree, having a plurality of nodes each representing one of the plurality of network security devices, based on hierarchical interconnections between the network security device and one or more directly connected upstream and downstream network security devices of the plurality of network security devices;
learning security policies implemented by one or more network security devices of the plurality of network security devices that form part of the network segment based on the CSF; and
determining whether the one or more network security devices are compliant with a security goal associated with the network segment by:
analyzing traffic passing through the network segment;
analyzing respective system configurations of the one or more network security devices; and
evaluating performance of the security policies based on the traffic.

19. The network security device of claim 18, wherein the security goal specifies at least one security rule and wherein the method further comprises when the security policies do not comply with the at least one security rule, then reporting, by the network security device, issues highlighting reasons for non-compliance.

20. The network security device of claim 19, wherein the method further comprises generating at least one recommendation for a change proposed to be made to the security polices based on the issues.

21. The network security device of claim 20, wherein the method further comprises generating recommendations for configuration optimization of the at least one network segment or a part thereof based on said analyzing respective system configurations of the one or more network security devices.

22. The network security device of claim 19, wherein the method further comprises reporting findings regarding performance of the security polices with respect to said analyzing traffic passing through the network segment.

23. The network security device of claim 19, wherein the method further comprises when the security polices do not comply with the at least one security rule, then causing, by the network device, the security polices to be updated so as to comply with the at least one security rule.

24. The network security device of claim 18, wherein the security goal is assigned to the network segment based on a security goal associated with a similar network segment within the private network.

25. The network security device of claim 18, wherein the network security device comprises a firewall, a gateway, an intrusion prevention system (IPS), an intrusion detection system (IDS), or a Unified Threat Management (UTM) appliance.

* * * * *